March 28, 1961 H. N. STEPHAN 2,976,777
PATTERN FOR TRACER CONTROLLED MACHINE TOOL
Original Filed Jan. 19, 1949 4 Sheets-Sheet 1

INVENTOR.
HALLIS N. STEPHAN
BY Hudson, Boughton,
Williams, David & Hoffmann.
ATTORNEYS

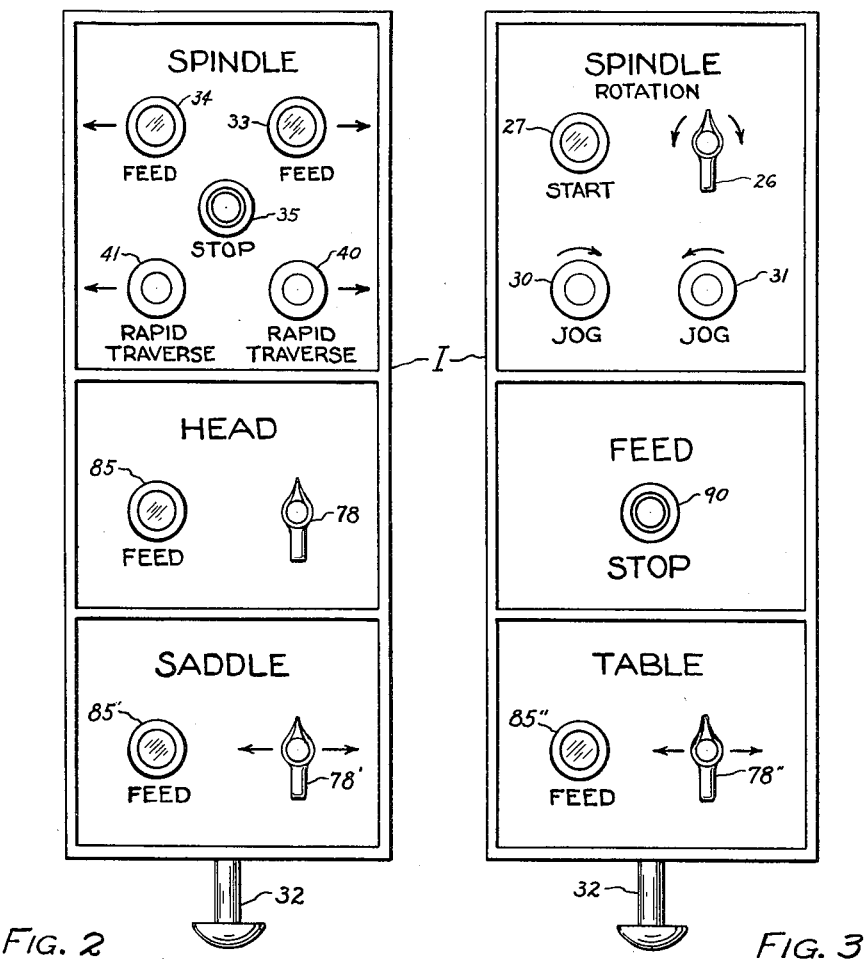

March 28, 1961  H. N. STEPHAN  2,976,777
PATTERN FOR TRACER CONTROLLED MACHINE TOOL
Original Filed Jan. 19, 1949  4 Sheets-Sheet 3

INVENTOR.
HALLIS N. STEPHAN
BY Hudson, Boughton,
Williams, David & Hoffmann.
ATTORNEYS March 28, 1961  H. N. STEPHAN  2,976,777
PATTERN FOR TRACER CONTROLLED MACHINE TOOL
Original Filed Jan. 19, 1949  4 Sheets-Sheet 4

INVENTOR.
HALLIS N. STEPHAN
BY Hudson, Boughton,
Williams, David & Hoffmann.
ATTORNEYS

United States Patent Office 2,976,777
Patented Mar. 28, 1961

1

2,976,777
PATTERN FOR TRACER CONTROLLED MACHINE TOOL

Hallis N. Stephan, Cleveland Heights, Ohio, assignor to The New Britain Machine Company, Cleveland, Ohio, a corporation of Ohio Original application Jan. 19, 1949, Ser. No. 71,624, now Patent No. 2,718,819, dated Sept. 27, 1955. Divided and this application July 1, 1955, Ser. No. 519,465

1 Claim. (Cl. 90—62)

The present invention relates to pattern controlled machine tools and this application is a division of my copending application, Serial No.71,624, filed January 19, 1949, now Patent No. 2,718,819, issued September 27, 1955.

The principal object of the invention is the provision of a novel and improved pattern for a pattern controlled machine tool.

The invention resides in certain novel constructions and combinations and arrangements of parts and further objects and advantages will be apparent to those skilled in the art to which it relates from the following description of the preferred embodiment described with reference to the accompanying drawings forming a part of this specification in which similar reference characters designate corresponding parts and in which Fig. 1 is a perspective view of a combined horizontal boring, drilling and milling machine comprising pattern control utilizing a pattern embodying the present invention;

Fig. 2 is an enlarged, front view of the pendant control station;

Fig. 3 is an enlarged, side view of the pendant control station;

Figure 1:
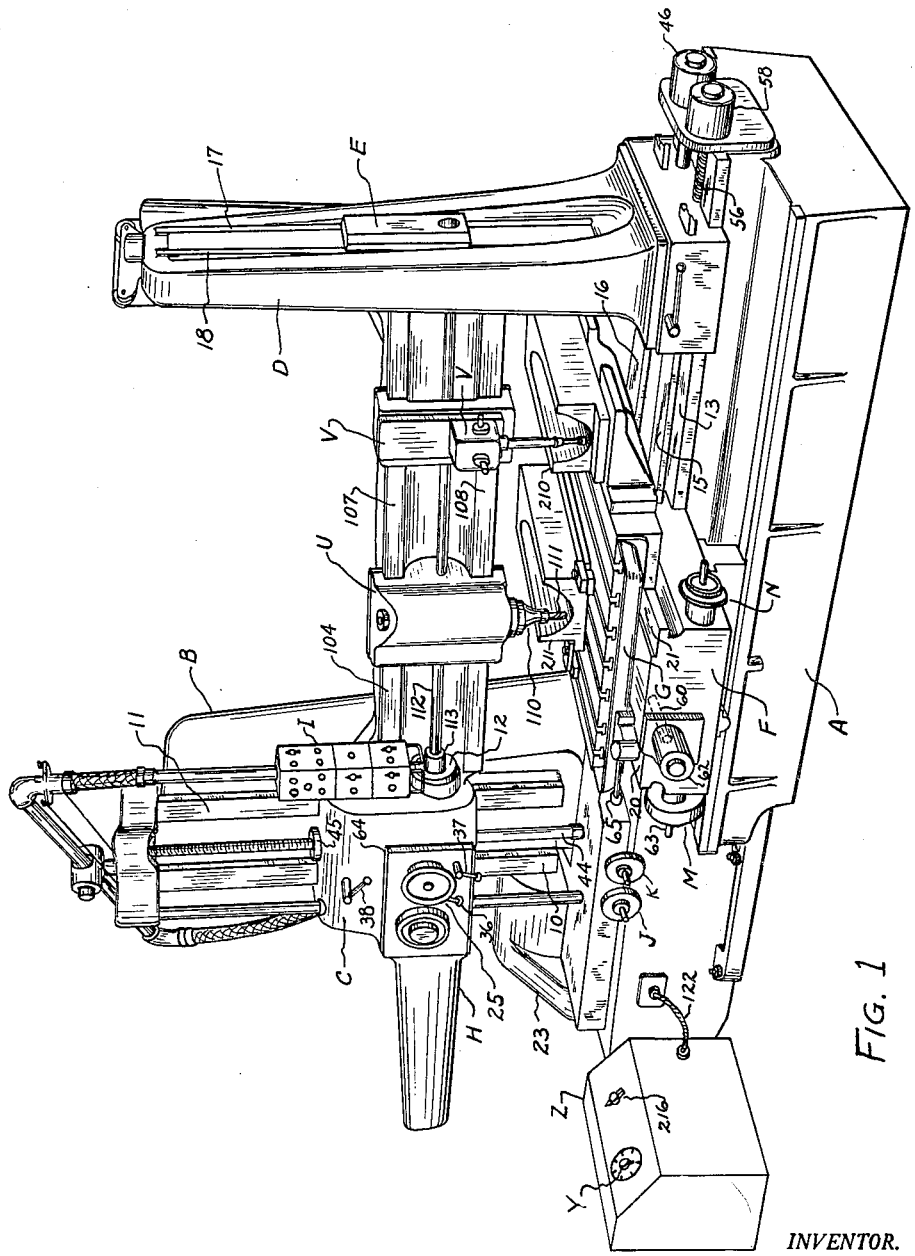
Figure 4:
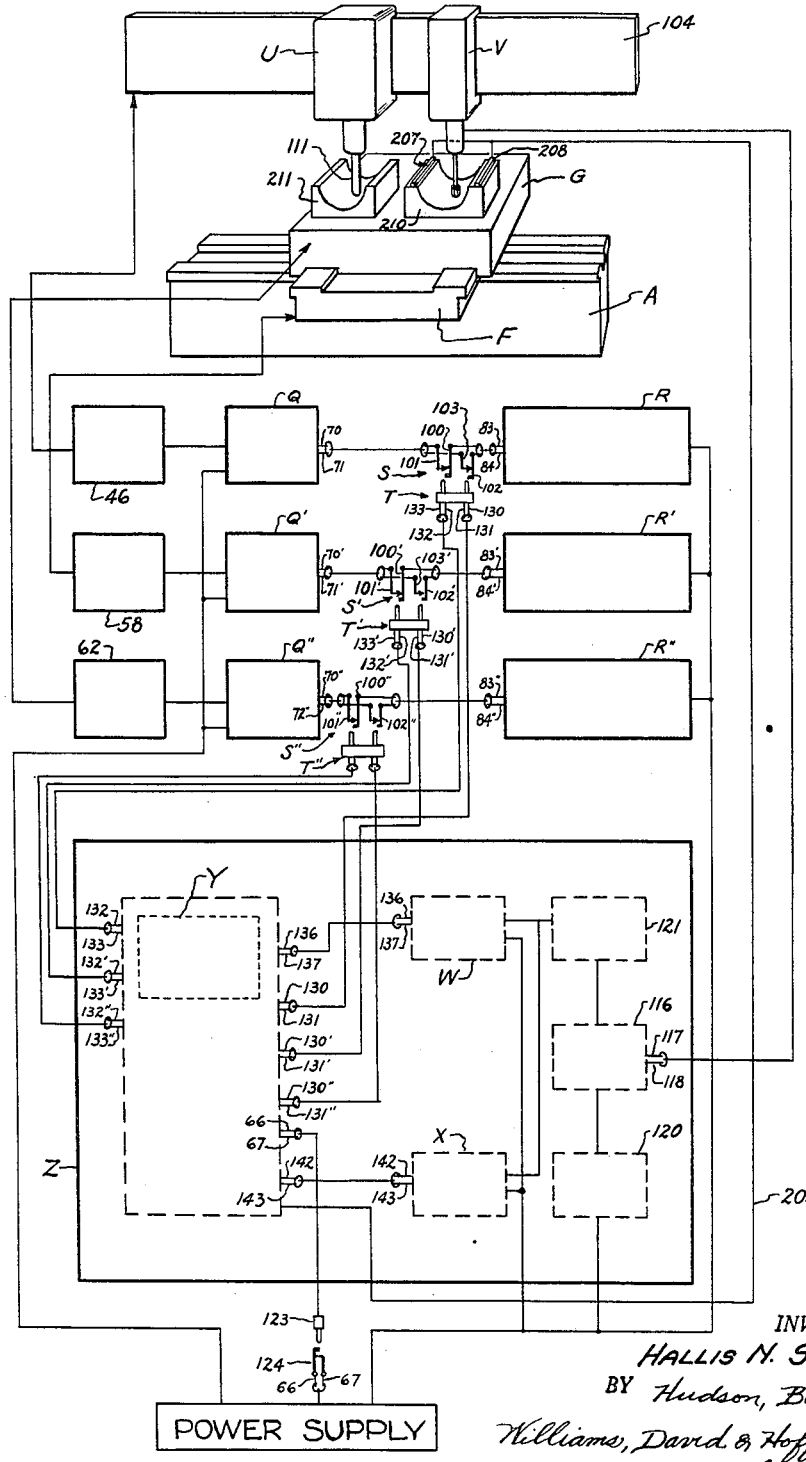
Fig. 4 is a diagrammatic view of the electrical control system.
Figure 5:
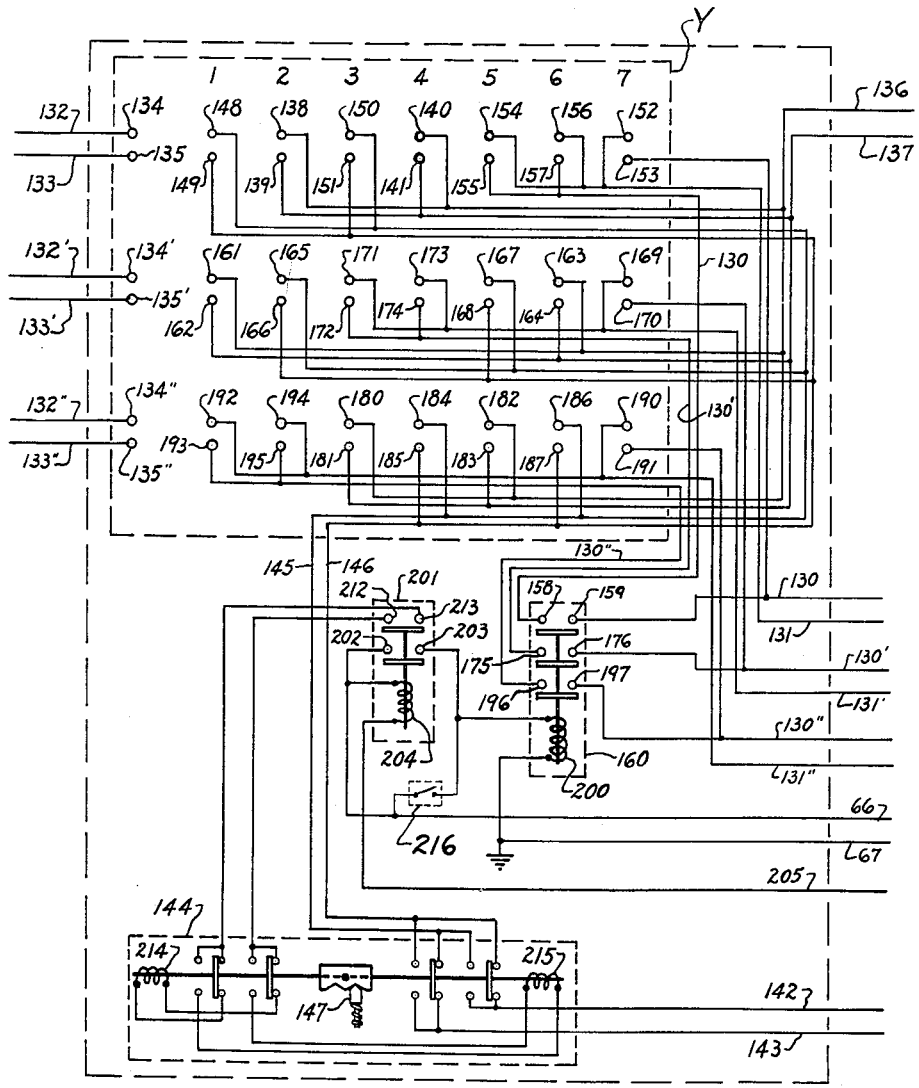
Fig. 5 is a schematic wiring diagram of a portion of the control mechanism.
Figure 6:
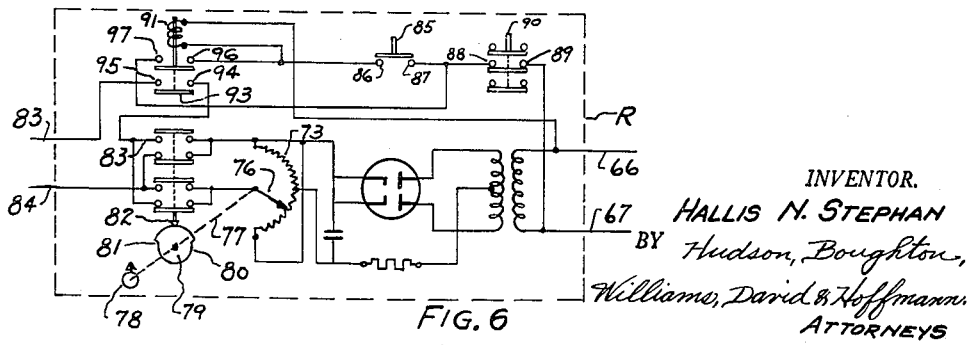
Fig. 6 is a schematic wiring diagram of one of the manual control circuits forming a part of the control mechanism.

While the invention is susceptible of various modifications and alternative constructions, it is herein shown and described as embodied in a combined horizontal boring, drilling and milling machine of the general character shown in United States Patent No. 2,350,174, issued May 30, 1944.

As shown in the drawings, the machine comprises a rectangular-shaped base A provided at one end with a vertical spindle head column B having ways 10, 11 on its front face upon which a spindle head C provided with a generally horizontal spindle 12 is mounted for vertical movement and at the other end with a vertical backrest or outboard support column D slidably supported for movement toward and from the spindle head column B on the horizontal main ways 13, 14 on the upper side of the bed A and underneath guards 15, 16 therefor. The backrest column D is provided with vertical ways 17, 18 upon which a backrest block E is mounted for vertical movement. In addition to the outboard support column D, the bed ways 13, 14 support a saddle F having on its upper side transversely extending, horizontal ways 20, 21 which, in turn, support a work table G.

The spindle 12 is rotated in opposite directions and moved in opposite directions lengthwise of its axis of rotation at different speeds to effect different feeding movements by a reversible, variable speed, spindle drive

2 or main motor housed within the bed A of the machine underneath the guard 23.

The control for the spindle drive and feed motor includes a potentiometer control knob 26 and a single "start" push button switch 27. The spindle drive motor can be rotated in opposite directions to effect continuous rotation of the spindle in the direction indicated by the arrows, adjacent to the potentiometer control knob 26 on the pendant I, depending upon the setting of the potentiometer control knob, by instantaneous actuation of the spindle rotation "start" push button switch 27. The spindle may be jogged in either direction, as indicated by actuation of the "jog" push button switches 30, 31. Rotation of the spindle can be stopped by pushing the "stop all" push button switch 32 projecting from the bottom of the pendant or one of the spindle "jog" push button switches 30, 31. The feed movement of the spindle is initiated by instantaneous actuation of one or the other of the illuminated continuous "feed" push button switches 33, 34 located on the front face of the pendant. The right-hand switch 33 initiates feed movement toward the right and the left-hand switch 34 toward the left. After a feed movement has been started, it may be stopped at any time by depressing the "stop all" push button switch 32 or the spindle feed "stop" push button switch 35.

The spindle can be rapid traversed in opposite directions by depressing one or the other of the "traverse" push button switches 40, 41 located below the continuous "feed" push button switches 34, 33.

The spindle head C is moved vertically along the spindle head column ways 10, 11 by a lead screw 44 having threaded engagement with a nut 45 located within and carried by the spindle head C. The lead screw 44 is adapted to be rotated in opposite directions by a reversible, variable speed, spindle head feed motor 46.

The reference character J designates a dial mechanism for indicating the position of the spindle head C and backrest block E and for permitting movement of the same by hand.

The saddle F is adapted to be moved longitudinally of the tool spindle 12 along the bed ways 13, 14 by a longitudinally extending lead screw 56 rotatably supported in the bed and held therein against longitudinal movement. The lead screw 56 has threaded engagement with a nut fixed in the saddle F. The right-hand end of the lead screw 56 is permanently connected to the rotor of a reversible, variable speed, saddle feed motor 58 bolted to the right-hand end of the bed A. The left-hand end of the lead screw 56 is operatively connected to a dial mechanism K similar to the dial mechanism J.

The table G is adapted to be reciprocated transversely of the tool spindle 12 along the ways 20, 21 by a lead screw 60 rotatably supported in the saddle F and held therein against longitudinal movement. The lead screw 60 has threaded engagement with a nut located within and fixed to the table G. A reversible, variable speed, table feed electric motor 62 is affixed to the front of the saddle F and has its rotor directly connected to the lead screw 60.

The saddle F is provided with two dial mechanisms M, N for indicating the position of the table relative to a reference point on the saddle or some other part of the machine. The dial mechanisms M, N are located at opposite sides of the saddle and the respective elements thereof are supported coaxially with a longitudinally extending shaft 63 rotatably supported in the saddle and connected to the lead screw 60.

The control levers for the spindle head and backrest block and the table clamps are shown and designated on the drawings by the reference characters 64, 65, respectively.

After the gear shift levers 36, 37 and the back gear lever 38 have been set in the desired positions, the remaining operations of the machine are controlled from the pendant control station I. The spindle head C, the saddle F and the table G can be selectively moved in either direction at the desired speed by proper manipulation of the manual control devices located on the pendant station I which control the actuation of, the direction of rotation, and the speed of the feed motors 46, 58 and 62, respectively, connected thereto. The feed motors 46, 58, 62 are alike as is the manual control mechanism for initiating and controlling their operation and only the spindle head feed motor 46 and its control mechanism will be described in detail. The corresponding parts of the control mechanism for the other motors, where shown, are indicated by the same reference characters but having a prime mark affixed thereto in the case of the saddle feed motor 58 and a double prime mark affixed thereto in the case of the table feed motor 62.

For purposes of simplification, the spindle head feed motor 46 shown is similar to that shown in Kuehni et al. United States Patent No. 2,410,295, issued October 29, 1946, as are many other parts of the control mechanism herein shown and alternating current power is supplied thereto in a similar manner by the wires 66, 67. The motor 46 operates at a speed and in a direction which is proportional to the magnitude and polarity of the voltage applied to the input control circuit comprising the wires 70, 71 of a motor control mechanism, designated generally as Q. Voltage is applied to the circuit comprising the wires 70, 71 for manual control of the operation of motor 46 by a manual control, designated generally as R, including a potentiometer resistor 73 located in the pendant control station to which direct current is supplied by a full wave rectifier. The potentiometer includes a slider 76 connected to a shaft 77 projecting through the front panel of the pendant station I where it is provided with a control knob 78. The shaft 77 is provided with a cam 79 having two radially offset, arcuate cam surfaces 80, 81 connected by a steep rise. The cam faces or surfaces 80, 81 are so constructed and operatively connected to a double pole, double throw switch 82 that the polarity of the output circuit consisting of the wires 83, 84 will be reversed as the potentiometer slider 76 passes the center point of the potentiometer resistance 73. When the potentiometer slider is in contact with the center of the potentiometer resistance, zero voltage is applied to the output circuit 83, 84 and as the potentiometer slider is moved in either direction, an increasing voltage is applied thereto, the polarity of which will depend upon the direction in which the control knob 78 and in turn the potentiometer slider is moved.

In order to permit stopping and starting of the motor 46 without changing the potentiometer setting and, in turn, the speed adjustment, a head "feed" push button switch 85 is provided having normally open contacts 86, 87 in series circuit with a pair of normally closed contacts 88, 89 of a "stop" feed push button switch 90 common to the three feed motors 46, 58, 62 and an operating solenoid 91 of a relay 93 having two pairs of normally open contacts 94, 95 and 96, 97, the former of which is connected in series circuit in the control wire 83 of the output circuit of the manual control R and the latter of which complete a holding circuit for maintaining the operating solenoid 91 of relay 93 energized after the head "feed" start push button switch 85 has been depressed and released until the "stop" push button switch 90 or the "stop all" push button switch 32 is depressed.

The output circuit or, in other words, the wires 83, 84 of the manual control R are normally connected to the input circuit, that is, the wires 70, 71 of the motor control Q through a double circuit jack S. Normally the contacts 100, 101 of the jack S are closed to connect the wire 83 to the wire 70 and the contacts 102, 103 are closed to connect the wire 84 to the wire 71.

In addition to being operable or usable in the ordinary manner, machine shown can be operated as a pattern controlled machine by connecting thereto suitable tracer or follower mechanism in the form of an attachment. The mechanism comprises a rail 104 detachably connected to and carried by the spindle head C and the backrest block E. The rail 104 has a pair of ways 107, 108 formed on its front face, which ways carry a tool head U and a tracer head V adjustably secured to the ways. The tool head U is provided with a vertical tool spindle 110 adapted to detachably carry a suitable metal cutting tool 111. The tool spindle 110 is driven from the spindle 12 through a splined shaft 112 to which the tool spindle 110 is connected by suitable gearing. The end of the shaft 112 adjacent to the spindle 12 is provided with a collar 113 detachably connected to the end of the spindle 12.

The tracer head V may be of any desired construction. The particular tracer head shown, except for its mounting on the rail 104, is similar to that shown in the aforesaid Patent No. 2,410,295 and is connected to the bridge 116 by wires 117, 118. The reference character 120 designates an oscillator connected to the bridge 116. The signal or control voltage from the bridge 116 is amplified by an amplifier 121 and fed to cosine and sine regulators W, X respectively adapted to be selectively connected to the motor controls Q, Q', Q" in place of the manual controls R, R', R" by a multi-position, drum controller Y to convert the machine to one which is pattern controlled.

The bridge 116, oscillator 120, amplifier 121, cosine regulator W, sine regulator X, and the drum controller Y are all housed in or form a part of a control cabinet Z adapted to be located adjacent to the machine proper and detachably connected thereto by a flexible cable 122, the free end of which contains the plugs T, T', T" and a single plug 123 adapted to be connected to a jack 124 for supplying alternating current to the control cabinet.

When the plugs are connected to their respective jacks, alternating current is supplied to the control cabinet Z the output circuit 83, 84 of the manual control R is connected to the wires 130, 131 and the input circuit 70, 71 of the motor control Q is connected to the wires 132, 133 leading to a pair of stationary contacts 134, 135 of the drum controller Y.

The drum controller Y has seven positions numbered 1 to 7 in the drawings and each position has three separate pairs of contacts adapted to be connected to the three separate pairs of stationary contacts 134, 135 and 134', 135' and 134", 135". As shown the output circuit 136, 137 of the cosine regulator is connected to pairs of contacts 138, 139 and 140, 141 in the second and fourth positions of the drum controller and which pairs of contacts are adapted to be connected to the stationary pair of contacts 134, 135 to place the head feed motor 46 under the control of the cosine regulator W. The output circuit 142, 143 of the sine regulator is connected through a multiple, double pole, double throw, solenoid operated reversing switch 144 to wires 145, 146 which switch is always held in one or the other of its closed positions by a spring loaded detent 147. The wires 145, 146 are connected to the pairs of contacts 148, 149 and 150, 151 in the first and third positions of the drum controller Y.

The pairs of contacts 148, 149 and 150, 151 are adapted to be selectively connected to the stationary contacts 134, 135 to place the head feed motor 46 under the control of the sine regulator X. The pair of contacts 152, 153 located in the seventh position and which contacts are adapted to be selectively connected to the stationary contacts 134, 135 are connected to the wires 130, 131.

The remaining two pairs of contacts 154, 155 and 156, 157 adapted to be selectively connected to the stationary contacts 134, 135 and which pairs of contacts 154, 155 and 156, 157 are located in the fifth and sixth positions of the drum controller are connected in parallel circuit with the wires 130, 131.

Of the contacts on the drum controller Y adapted to be selectively connected to the stationary contacts 134', 135' connected to the wires 132', 133', which wires are connected to the motor control Q' for the saddle feed motor 58, the pairs of contacts 161, 162 and 163, 164 located in the first and sixth positions are connected to the cosine regulator W. In a similar manner, the pairs of contacts 165, 166 and 167, 168 are connected to the wires 142, 143 by the wires 145, 146 and the multiple, double pole, double throw switch 144 and in turn are connected to the sine regulator X.

The remaining two pairs of contacts 171, 172 and 173, 174 adapted to be selectively connected to the stationary contacts 134', 135' and which pairs of contacts 171, 172 and 173, 174 located in the third and fourth positions of the drum controller are connected in parallel circuit with the wires 130, 131' connected to the output circuit of the manual control R' for the saddle feed motor 58 through a pair of normally open contacts 175, 176 of the time delay relay 160. The contacts 175, 176 are located in the wire 130' in such a manner that they do not interfere with its connection to the contact 170.

The drum controller Y comprises seven pairs of contacts adapted to be selectively connected to the stationary contacts 134", 135" connected to the motor control Q" associated with the table feed motor 62. Of these pairs of contacts, the pairs 180, 181 and 182, 183 are connected to the output circuit of the cosine regulator W; the pairs 184, 185 and 186, 187 are connected to the output circuit of the sine regulator X; the pair 190, 191 is connected to the manual control R" for the table feed motor 62; and the pairs of contacts 192, 193 and 194, 195 are connected to the output circuit of the manual control R" for the table feed motor 46.

The operating solenoid 200 of the time delay relay 160 is adapted to be periodically energized by a relay 201, the normally open contacts 202, 203 of which are in series circuit with the operating solenoid 200. The wire 67 of the alternating current supply is grounded and the wire 66 is connected to one side of the operating solenoid 204 of the relay 201. The opposite end of the operating solenoid 204 of relay 201 is connected by a wire 205 connected to two strips of conducting material 207, 208 fixed to the pattern 210 with which the tracing head V of the tracing or follower mechanism cooperates. The pattern 210 is fixedly connected to the work table G as is the work 211.

With the drum controller Y in the No. 2 position the saddle moves the work and pattern in a direction parallel to the axis of rotation of the spindle 12 and the spindle head and backrest block move the rail 104 and in turn the tool and tracer heads U and V vertically under the control of the pattern and tracer head and the cosine and sine regulators respectively. When the tracer head contacts one or the other of the conductor strips 207, 208 at opposite sides of the pattern proper, it completes the circuit to ground through the operating solenoid 204 of relay 201 which in turn causes the table feed motor 62 to move the table a predetermined distance at right angles to the axis of rotation of the spindle 12 and thus position the tracer head V and tool 111 for the next cut.

Simultaneously normally open contacts 212, 213 are closed to reverse the direction of rotation of the saddle feed motor 58 and the direction in which the saddle is moved. For this purpose the contacts 212, 213 are connected in series circuit with one or the other of the operating solenoids 214, 215 of the reversing switch 144 through a second set of double pole, double throw switch contacts. Simultaneously the reversing switch 144 connects the opposite operating solenoid thereof with the contacts 212, 213 so that the switch will reverse upon the next closing of the contacts.

A switch 216 may be provided to short circuit or shunt the contacts 202, 203 of relay 201, thus maintaining the operating solenoid 200 of relay 160 energized, in which event, with the drum controller Y in the second position the table feed motor 62 can be manually controlled by the potentiometer knob 78" to cause the table to move forward or backward underneath the tool and tracer head simultaneously with the movement of the spindle head C and saddle F under the control of the tracer and the cosine and sine regulators. In this manner the tool can be made to follow an irregular, horizontal path rather than the straight or linear path previously referred to. When the selector switch Y is positioned in the seventh position the head, saddle and feed motors 46, 58 and 62 can be operated by the manual controls including the potentiometer control knobs 78, 78' and 78" and the feed start push button switches 85, 85' and 85" located on the pendant control station I. When the drum controller Y is located in any of its other six positions, two of the feed motors will be connected to the cosine and sine regulators and the third to its respective manual control through the time delay relay 160, etc.

From the foregoing description of the preferred embodiment of the invention, it will be apparent that there has been provided a novel and improved pattern for a pattern controlled machine. While the preferred embodiment of the invention has been described with considerable detail, the invention is not limited to the particular pattern construction shown. It is my intention to cover hereby all modifications of the pattern shown which come within the practice of those skilled in the art to which the invention relates and within the scope of the appended claim.

Having thus described my invention, I claim:

A pattern for use with a pattern controlled machine tool having tool and work support means relatively movable in three directions at right angles to one another and means for operatively connecting a tracer with one of said means and a pattern with the other of said means, said pattern comprising a non-planar surface to be traced by the tracer surrounded at least in part by a second surface, one of said surfaces being an electrical insulator and the other an electrical conductor.

References Cited in the file of this patent

UNITED STATES PATENTS

| | | |
|---|---|---|
| 2,354,391 | McCourt | July 25, 1944 |
| 2,588,386 | Hubbard et al. | Mar. 11, 1952 |
| 2,640,176 | Calosi | May 26, 1953 |
| 2,679,620 | Berry | May 25, 1954 |
| 2,704,012 | Trinkle | Mar. 15, 1955 |